US006203137B1

(12) United States Patent
Niimura et al.

(10) Patent No.: US 6,203,137 B1
(45) Date of Patent: Mar. 20, 2001

(54) INK JET RECORDING APPARATUS AND WASTE INK TANK THEREOF

(75) Inventors: Hiroe Niimura; Toshio Kumagai, both of Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 08/956,422

(22) Filed: Oct. 23, 1997

(30) Foreign Application Priority Data

Oct. 24, 1996 (JP) ..................................... 8-282730

(51) Int. Cl.[7] ............................ B41J 2/165; B41J 2/17; G01D 11/00

(52) U.S. Cl. ............................ 347/36; 347/95; 347/96; 347/100

(58) Field of Search ............................ 347/36, 100, 95, 347/96

(56) References Cited

U.S. PATENT DOCUMENTS

| | | | | |
|---|---|---|---|---|
| 4,786,288 | * | 11/1988 | Handa et al. | 347/100 |
| 4,901,094 | * | 2/1990 | Iwagami et al. | 347/36 |
| 5,074,914 | * | 12/1991 | Shirota et al. | 347/100 |
| 5,157,421 | * | 10/1992 | Kitahara | 346/140 |

FOREIGN PATENT DOCUMENTS

| | | | | |
|---|---|---|---|---|
| 0 693 586 | | 1/1996 | (EP) | D06P/1/00 |
| 0 699 534 | | 3/1996 | (EP) | B41J/2/185 |
| 0 704 306 | | 4/1996 | (EP) | B41J/2/165 |
| 0 711 867 | | 5/1996 | (EP) | D06P/5/00 |
| 57-22065 | | 2/1982 | (JP) | B41J/3/04 |
| 357022065 | * | 2/1982 | (JP) | 347/36 |
| 60-147344 | | 8/1985 | (JP) | B41J/3/04 |
| 62-26501 | * | 8/1989 | (JP) | 347/36 |
| 70227974 | | 8/1995 | (JP) | B41J/2/18 |

OTHER PUBLICATIONS

Patent Abstracts of Japan vol. 095, No. 011, Dec. 26, 1995 & JP 07 227974 A (Copyer Co Ltd) Aug. 29, 1995 *Abstract.
Patent Abstracts of Japan vol. 006, No. 083 (M–130) May 21,1982 & JP 57 022065 A (Canon Inc) Feb. 4, 1982 *Abstract.
Patent Abstracts of Japan vol. 095, No. 005, Jun. 30, 1995 & JP 07 032607 A (Canon Inc), Feb. 3, 1995 *Abstract.
Patent Abstracts of Japan vol. 016, No. 195 (M–1246), May 12, 1992 & JP 04 028560 A (Canon Inc), Jan. 31, 1992 *Abstract.
Patent Abstracts of Japan vol. 097, No. 005, May 30, 1997 & JP 09 011493 A (Canon Inc) Feb. 14, 1997 *Abstract.

* cited by examiner

*Primary Examiner*—John Barlow
*Assistant Examiner*—An H. Do
(74) *Attorney, Agent, or Firm*—Sughrue, Mion, Zinn, Macpeak & Seas, PLLC

(57) ABSTRACT

An ink coagulating agent of metal salt is provided in a waste ink tank. The coagulating agent is dissolved in aqueous solvent to be a metal salt solution. Absorbers of a porous material are impregnated with the metal salt solution and disposed in the waste ink tank.

17 Claims, 4 Drawing Sheets

INK JET RECORDING APPARATUS AND WASTE INK TANK THEREOF

BACKGROUND OF THE INVENTION

1. Field of the Invention

The present invention relates to an ink jet recording apparatus for performing recording by jetting ink onto a recording medium, and particularly relates to a structure of a waste ink tank for storing waste ink of an ink-jet ink composition containing a pigment, thermoplastic resin, and a dispersing agent in an aqueous medium.

2. Description of the Related Art

Ink jet recording is superior in silence and high-speed printing properties in recording. Further, it has excellent characteristics that the printing process is simple because of direct printing, and printing can be performed with color easily, etc.

In ink jet recording, however, recording is performed by making ink fly from a fine injection nozzle of a recording head. Accordingly, at the injection nozzle portion, ink is often thickened or dried and solidified at the time of non-recording, for example, standby for printing, etc., in printing under an environment of a high temperature and low humidity, or in printing at low frequency, so that there occurs sometimes defective injection or non-injection (loading). Then, injection recovery treatment is carried out to absorb ink from an injection nozzle portion so as to remove ink thickened or dried and solidified at the injection nozzle portion, or injection stability maintaining treatment is carried out to perform flushing periodically to thereby prevent ink from being thickened or dried. The ink generated by the treatment is stored, as waste ink, in a waste ink tank provided in an apparatus. With respect to a waste ink tank, generally, a method is known in which in order to prevent a waste ink from leaking from the waste ink tank during transport or the like, an absorber of porous material is stored in a waste ink tank vessel so that the absorber is impregnated with the waste ink to thereby store and hole the waste ink therein.

Japanese Patent Publication No. Sho. 57-22065 discloses a method in which an absorber is stored and a volatile one of ink components is evaporated by ventilation, heating, or the like. Further, Japanese Patent Publication No. Sho. 60-147344 discloses a method in which a macromolecular absorber is stored to gelate waste ink. According to the method, not only leakage can be prevented but also a larger quantity of ink can be stored than the volume of a waste ink tank to thereby make it possible to reduce the size of the apparatus.

Recently, in an ink jet recording apparatus, on the other hand, such ink is developed in which a pigment is used as coloring material and thermoplastic resin is dispersed and held in a liquid by using a dispersing agent in order to improve the printing speed, the printing quality, and the light and water resistance of printed matters. Such pigment and resin dispersing type ink has advantages in that running or spread of ink is remarkably suppressed and high-level water resistance is obtained by performing heat fixing in recording.

In the case of using such pigment and resin dispersing type ink, in such a conventional configuration of a waste ink tank utilizing an absorber as described above, thickening or solidification of waste ink due to drying is caused on the surfaces of the absorber so as to block the fine holes of the absorber by the waste ink, so that the absorber becomes incapable of absorbing the waste ink. On the other hand, the macromolecular absorber does not absorb a solid component occupying the greater part of the ink composition but holds a water component which is a volatile component, so that its absorbing efficiency is poor. The absorbing efficiency means the ratio of the volume of waste ink capable of being held to the volume of the waste ink tank. Therefore, there has been a problem that the absorber cannot exhibit its ability effectively both in the absorbing speed and absorbing efficiency.

As the configuration of a waste ink tank for such ink as described above, the Applicant of the present application has proposed such a waste ink tank structure shown in FIG. 5 for the purpose of improving the absorbing efficiency and absorbing speed of waste ink.

A waste ink tank 100 stores an absorber 110 in a waste ink tank vessel 101. The absorber 110 has a characteristic that the horizontal absorbing speed is higher than the vertical absorbing speed, and has a through hole 103 extending from a top surface to a bottom surface thereof. The waste ink is led from a waste ink pipe 105 into a lower portion of the waste ink tank 100 through the through hole 103 and absorbed from the center in the horizontal direction, and this process is conducted step by step upward from below so as to be successively absorbed and held.

Even with the foregoing proposed structure, a water content may not be efficiently absorbed into the absorber in accordance with the ink composition and the environment where a recording apparatus is provided. For example, in the case of using ink having a high evaporation rate or when the environment is high in temperature and low in humidity, evaporation of a water content is promoted from a surface of the ink contacting with air so that a surface film which is a phenomenon peculiar to the pigment and resin dispersing type ink is formed on the ink surface. Newly stored waste ink is prevented from entering the absorber deeply because of formation of such a surface film. Thus, the waste ink cannot be absorbed efficiently.

Further, the residual solid component stays on the absorber surface in the form of a surface film although a water content is absorbed in the absorber, so that the ink evaporation rate in the surface film is considerably reduced. A solid component is accumulated on the absorber surface whenever waste ink is generated. In the case where waste ink is generated at a high frequency, however, additional waste ink is stored in the waste ink tank before the ink in the surface film is perfectly dried and solidified, so that the thickened ink which is not perfectly dried is further prevented from being dried. When the waste ink tank in the foregoing state is left in the environment which is high in temperature and high in humidity, a problem is caused so that the surface film is softened and the ink which is not perfectly dried absorbs humidity and fluidity is generated in the waste ink, resulting in leakage of ink during transportation.

SUMMARY OF THE INVENTION

Therefore, the present invention has been accomplished to solve the foregoing problems, and it is object of the present invention to provide a waste ink tank in which waste ink can be treated stably and independently of the ink composition and the environmental variations or the like, and in which waste ink can be prevented from leaking.

According to a first aspect of the invention, there is provided a waste ink tank of an ink jet recording apparatus for storing waste ink of an ink-jet ink composition containing a pigment, thermoplastic resin, and a dispersing agent in an aqueous medium, the waste ink tank comprising an ink coagulating agent including metal salt.

According to a second aspect of the invention, there is provided an ink jet recording apparatus for performing recording by jetting ink onto a recording medium, comprising: a waste ink tank for storing waste ink of an ink-jet ink composition containing a pigment, thermoplastic resin, and a dispersing agent in an aqueous medium; and heating means for heating the waste tank which heats the waste ink at a temperature not lower than a lowermost film forming temperature of the thermoplastic resin contained in the waste ink.

According to a third aspect of the invention, there is provided an ink coagulating agent for coagulating waste ink of an ink-jet ink composition containing a pigment, thermoplastic resin, and a dispersing agent in an aqueous medium, the ink coagulating agent comprising metal salt.

DETAILED DESCRIPTION OF THE PREFERRED EMBODIMENTS

The present invention will be described below in detail with reference to embodiments.

Figure 1:
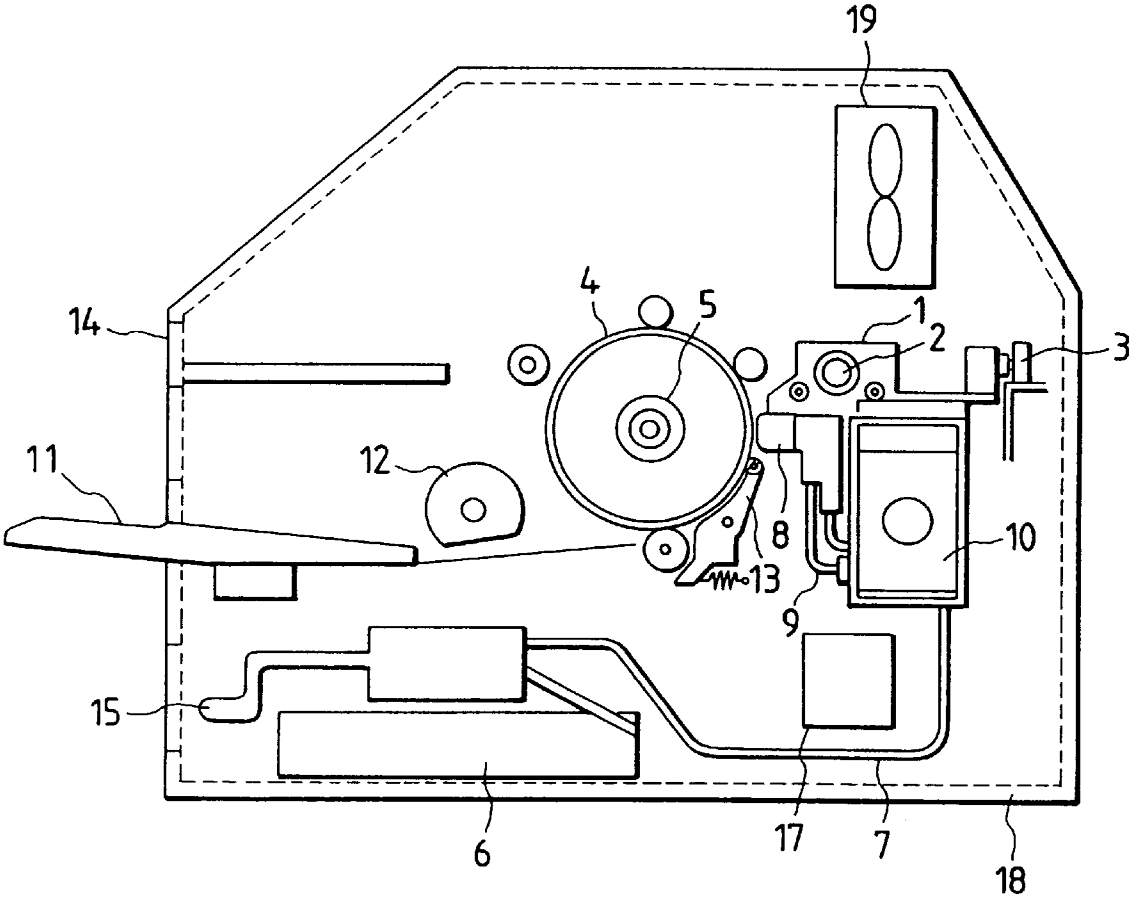
FIG. 1 is a schematic view showing an ink-jet recording apparatus with the waste ink tank according to the present invention.

FIG. 1 shows an embodiment of the present invention. In the drawing, the reference numeral 1 designates a carriage which is configured to be supported on guide members 2 and 3 so as to move in parallel to a rotary shaft 5 of a platen 4 which will be described later. A recording head 8 and a sub-tank 10 are mounted on the carriage 1 in a manner so that the recording head 8 is connected to one end of a tube 7 connected at its other end to an ink cartridge 6 provided in a casing 18 and the sub-tank 10 is connected to the recording head 8 through a tube 9 connected at its one end to the recording head 8.

Further, in the non-printing area, there are provided capping means for contacting with the recording head 8 so as to seal the latter and a waste ink tank 17 for storing ink wasted from the recording head 8.

The reference numeral 4 designates the above-mentioned platen which is configured so as to hold, on its surface, recording paper taken out from a feed tray 11 by means of a pick-up roller 12 so that dots are formed on the recording paper with ink drops jetted from the recording head 8, and the recording paper is discharged-into a discharge port 14 while drying the ink by heating with a built-in heater and by means of ventilation with a waste fan 19.

The reference numeral 6 designates the above-mentioned ink cartridge which is configured such that an ink supply pin is inserted by means of a lever 15 which can be operated from the outside of the casing 18 so that ink can be supplied into the recording head 8 through the ink tube 7 connected to the pin.

Description will be made below as to the pigment and resin dispersing type ink used in this embodiment.

4 parts of styrene acrylic acid copolymer resin (weight average molecular weight=25000; acid value=200); 2.7 parts of triethanol amine; 0.4 parts of isopropyl alcohol; and 72.9 parts of ion exchange water were perfectly dissolved while heating at 70° C. Next, 20 parts of carbon black MA-100 (produced by Mitsubishi Chemical Corp.) was added to the above solution. After premixing, dispersing was performed by using EIGER MILL (produced by Eiger Japan K.K.) so that the average particle diameter of the pigment became 100 nm (beads filling ratio=70%; media diameter=0.7 mm). Thus, the pigment dispersing solution was prepared. An ink composition having the following composition was prepared by using the foregoing pigment dispersing solution.

- the foregoing pigment dispersing solution 10 parts
- styrene acrylester emulsion 15 parts (as a solid component)
- diethylene glycol 3 parts
- Maltitol 10 parts (as a solid component)
- acetylene glycol group surface active agent 0.1 parts
- anion surface active agent 0.3 parts
- disodium hydrogenphosphate 0.1 parts
- ion exchange water 36.5 parts Further, styrene acrylester emulsion which is thermoplastic resin is water dispersions containing a solid component by 50% and Maltitol is an aqueous solution containing a solid component by 80%. Therefore, each of the foregoing values is expressed in terms of solid component value. As the acetylene glycol group surface active agent, used was SURFYNOL 465 (produced by Nisshin Chemical Industry Co., Ltd.; polyethylene oxide adduct of 2,4,7,9-tetramethyl-5-decyne-4,7-diol). Further, as the anion surface active agent, used was Hitenol N. 07 (polyoxyethylene alkyl nonyl phenylether).

The foregoing compound components were mixed with each other to prepare an ink composition. The thus prepared ink composition was passed through a metal mesh filter (twill weave; 2300 meshe, available from Manabe Kogyo Co., Ltd.) to thereby obtain an ink composition.

The ink deposited from the recording head onto a recording medium is heated by means of the heater so that the water content is rapidly evaporated. The particle surfaces of the thermoplastic resin in the ink are fused so that the particles adhere to each other-or to the recording medium. As a result, printing having no ink running and being superior in water resistance can be performed.

On the other hand, it was found that the ink according to this embodiment has such characteristics that the ink is superior in the age-stability and the quality hardly deteriorates even when the ink is filled in an aluminum pack, while, when metal salt is mixed into the ink, a coagulating phenomenon is generated in the ink and re-dispersion is not caused thereafter. The reason for this is estimated that metal cations liberated from the metal salt by the solvent component in the ink chemically react with the dispersing component which holds the dispersing state of the particles in the ink so that the dispersing action is lost. Examples of the preferable cation having such an effect include $Mg^{++}$, $Ca^{++}$, $Cu^{++}$, $Ni^{++}$, $Zn^{++}$, $Ba^{++}$, $Fe^{++}$, $Al^{+++}$, $Fe^{+++}$, and $Cr^{+++}$ which are polyvalent and have a high ionizing property. Further, examples of the preferable anion which is bonded with the foregoing cation to produce salt include $Cl^-$, $NO_3^-$, $I^-$, $Br^-$, $ClO_3^-$, and $CH_3COO^-$. Therefore, the metal salts include $CaCl_2$, $Ca(NO_3)_2$, $CaI_2$, $CaBr_2$, $Ca(ClO_3)_2$, $Ca(C_2H_3O_2)_2$, $CuCl_2$, $Cu(NO_3)_2$, $CuBr_2$, $Cu(ClO_3)_2$, $Cu(C_2H_3O_2)_2$, $NiCl_2$, $Ni(NO_3)_2$, $NiI_2$, $NiBr_2$, $Ni(C_2H_3O_2)_2$, $MgCl_2$, $Mg(ClO_3)_2$, $MgI_2$, $MgBr_2$, $Mg(ClO_3)_2$, $Mg(C_2H_3O_2)_2$, $ZnCl_2$, $Zn(NO_3)_2$, $ZnI_2$, $ZnBr_2$, $Zn(ClO_3)_2$, $Zn(C_2H_3O_2)_2$, $BaCl_2$, $BaI_2$, $BaBr_2$, $Ba(ClO_3)_2$, $Ba(C_2H_3O_2)_2$, $Al(NO_3)_4$, $Cr(NO_3)_3$, $Cr(C_2H_3O_2)_3$, $FeCl_3$, $Fe(NO_3)_3$, $FeI_3$, and $FeBr_3$. In the experiment, it was found that in the case of using, as the metal salt, 6-hydrates of magnesium nitrate $Mg(NO_3)_2.6H_2O$, the metal salt of 1 g could coagulate the ink of this embodiment of about 100 g.

Therefore, if the metal salt is put into the waste ink tank in advance, the metal cation can be liberated from the metal salt by the water content in the discharged waste ink to thereby make the ink coagulate. Since the volatile component is evaporated thereafter, the quantity of the waste ink is reduced and hence a larger quantity of waste ink can be stored relatively to the volume of the waste ink tank. The component once coagulated has lost re-resolving property thereafter so that waste ink can be prevented from leaking during transportation or the like of the recording apparatus.

Although the metal salt can be directly provided in the waste ink tank, in that case there is a possibility that the metal salt leaks into the apparatus to cause corrosion of metal portions. Further, although such a method that the metal salt is disposed on the bottom portion is considered, coagulated ink is accumulated on the upper portion so that not-yet-reacted metal salt is apt to remain on the bottom portion to prevent newly stored waste ink from reacting with the metal salt. Accordingly, the structure shown in FIG. 2 was used in this embodiment as a more preferable configuration.

Figure 2:
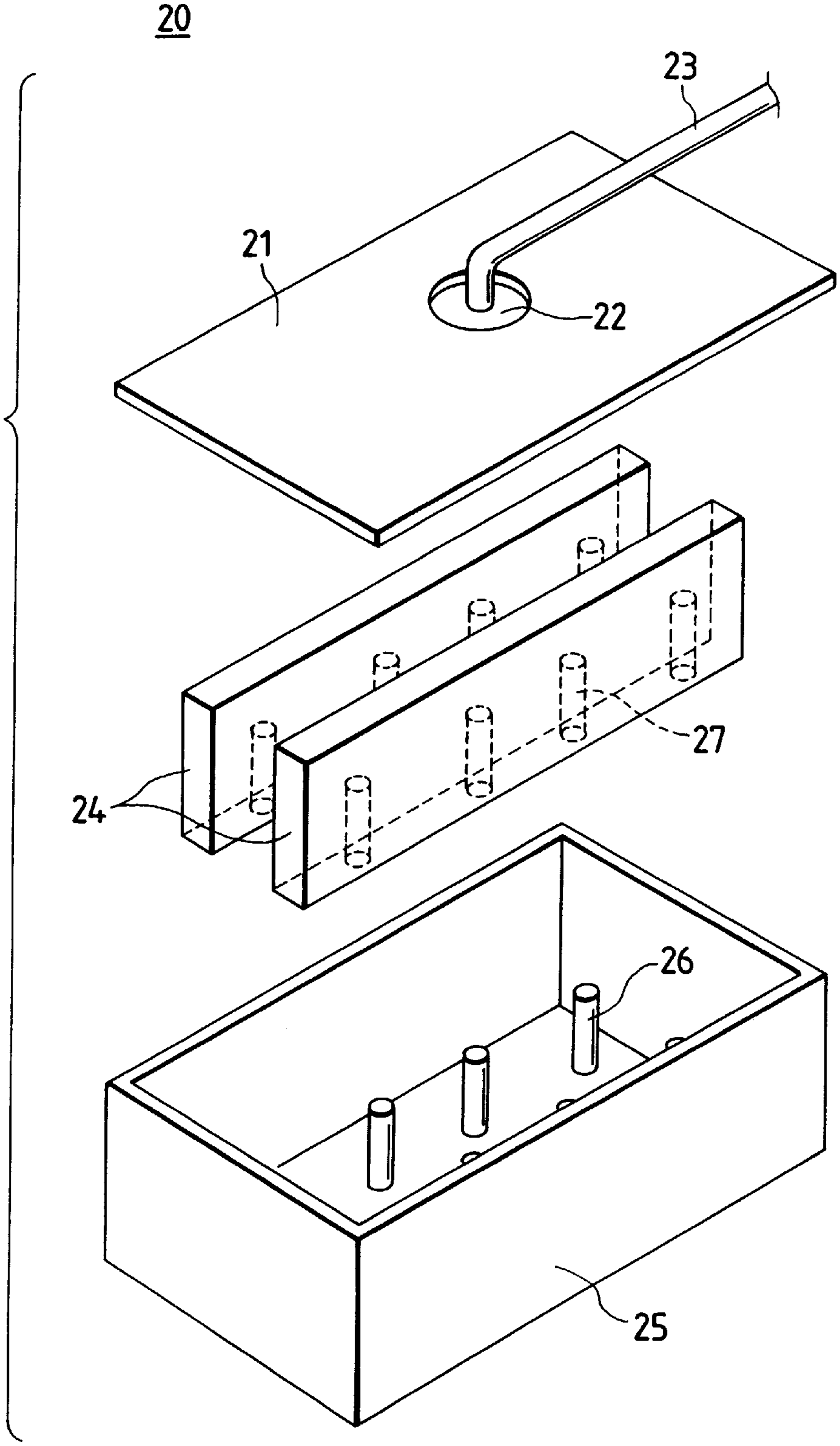
FIG. 2 is an exploded perspective view showing the fundamental configuration of the waste ink tank according to the present invention.

FIG. 2 shows the fundamental configuration of a waste ink tank 20 according to the present invention. The reference numeral 21 designates an ink tank cover. The ink tank cover 21 has a waste ink lead-in port 22 for leading-in waste ink from a recording head through a waste ink pipe 23. The waste lead-in port 22 acts also as a vent hole through which the volatile component is evaporated from the waste ink. The reference numeral 25 designates a waste ink tank vessel. Fixing shafts 26 are provided on the bottom of the waste ink tank vessel so as to prevent absorbers 24 impregnated with a treatment solution as a coagulating agent, which will be described later, from being transformed or one-sided because of a shock due to falling or the like. Although the absorbers 24 are fixed by eight fixing shafts 26 in total in the drawing, the number of the fixing shafts 26 is not limited to eight so long as the configuration can attain the foregoing objects. The reference numeral 24 designates absorbers. Shaft holes 27 of the same number as that of the fixing shafts 26 are formed in the absorbers 24. Each shaft hole 27 may be formed as a through hole. As the absorber, used were compression-formed fibers produced by compressing nylon fibers of 50% and polyester fibers of 50% to about 200 g $m^3$ by means of needle punching processing. The absorber was impregnated with the treatment solution by the quantity required for coagulating the pigment dispersing type ink. The treatment solution is prepared by dissolving metal salt into a solvent. As the solvent, it is preferable to use a solvent having low volatility and high solubility to salt so as to prevent recrystallization of the salt due to reduction in quantity because of spontaneous evaporation. As the representative preferable solvent, water-soluble solvents such as diethylene glycol, triethylene glycol, and glycerol may be used. Such a solvent produces an effect that since the metal salt is dissolved in the low volatile solvent in advance and the metal ions are already liberated, the rate of reaction is remarkably improved. Further, waste ink is absorbed and held in the absorbers and hence hardly leaks outside.

According to the experiment, it was found that in the case of using 6 hydrates of magnesium nitrate as the salt and using diethylene glycol as the solvent, the salt was stably soluble up to the concentration of 55% by weight. Accordingly, in this embodiment, 55 weight % of powder of 6 hydrates of magnesium nitrate was mixed and agitated with 45 weight % of diethylene glycol so as to be dissolved therein to prepare a salt solution. An absorber having a volume of 7500 $mm^3$ was impregnated with the salt solution by 45 g and two of the waste ink tanks were accommodated in a waste ink tank having a volume of about 900000 $mm^3$. It is more preferable that, when a suitable quantity of ion exchange water is mixed with the water soluble solvent, the absorber can be more uniformly impregnated with the salt solution and the time taken for performing mixing dissolution can be shortened. The mixed ion exchange water is evaporated after impregnation and hence the volume where waste ink can be stored is not reduced. Further, the absorbers impregnated with the salt solution are fixed vertically in the waste ink tank and therefore waste ink is accumulated upward from the bottom. As a result, waste ink to be newly stored can contact with not-yet-reacted metal ions without being inhibited by a coagulated ink component and hence it is possible to stably coagulate waste ink to the end. In this embodiment, the available volume of the waste ink tank was about 800000 $mm^3$, the quantity of waste ink which could be actually stored was about 2000000 $mm^3$ in terms of the quantity of ink before evaporated, and the ratio of residual ink was 40%. The ratio of residual ink means the ratio of the quantity of waste ink remaining in the waste ink tank to the quantity of waste ink which has been stored in the waste ink tank. This ratio is substantially equal to 38.5% which is the ratio of the quantity of the nonvolatile component in the ink when the ink is completely dried and solidified. Further, even in an up-side-down state, no waste ink could flow out because of solidification.

Figure 3A:
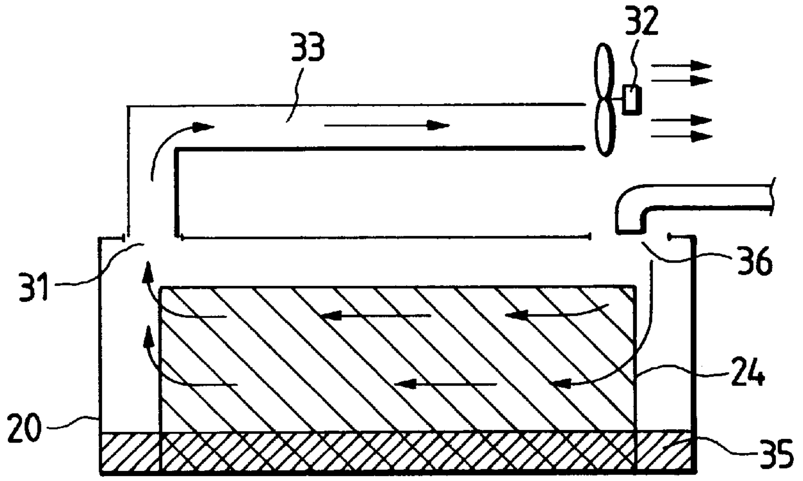
FIGS. 3(*a*) and 3(*b*) are side and top views, respectively, showing a second embodiment of the waste ink tank according to the present invention.
Figure 3B:
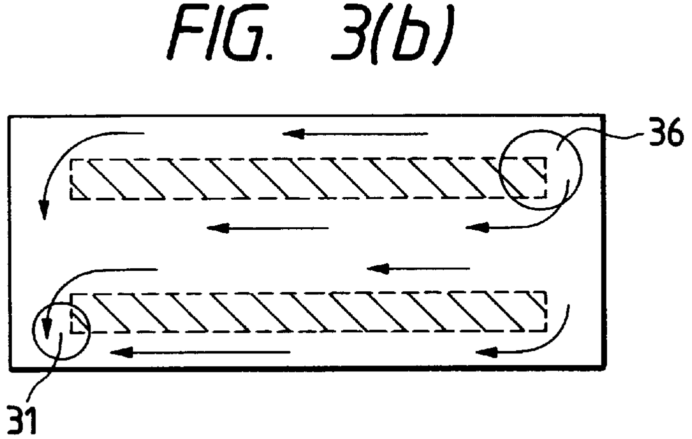

FIGS. 3(*a*) and 3(*b*) shows a second embodiment of the present invention. FIGS. 3(*a*) and 3(*b*) are a side view and a top view respectively. In the drawings, arrows show a flow of air. A vent hole 31 is formed in a waste ink tank 20 and air is blown by means of a waste fan 32 from an exclusive air port 36 to the vent hole 31 through a branched duct 33. Although the waste fan 32 is caused to act also as an inward waste fan through the branched duct 33 to suppress an increase of the cost, an exclusive air-blower fan may be provided. By provision of such an exclusive air-blower fan, a large quantity of air can be made to flow in spaces among absorbers 24. Waste ink 35 is laminated in layers from the bottom of the waste ink tank and ink newly wasted and containing a large ratio of volatile component is accumulated in an upper layer. Therefore, the water content is more effectively evaporated to thereby improve the efficiency of treatment of waste ink. In this embodiment, as an example of more preferable conditions, the exclusive air port 36 and the vent hole 31 are provided in the waste ink tank diagonally in plane so that a uniform flow of air is obtained. An exclusive air port 36 may be provided in a portion separated from the waste ink lead-in port in accordance with the layout inside the ink jet recording apparatus. Conventionally, evaporation has been promoted by flowing air into the waste ink tank. According to the present invention, however, there is a special effect that evaporation can be performed with high efficiency and no waste ink flows out, because the air flow path is extremely widened in the waste ink tank.

Figure 4:
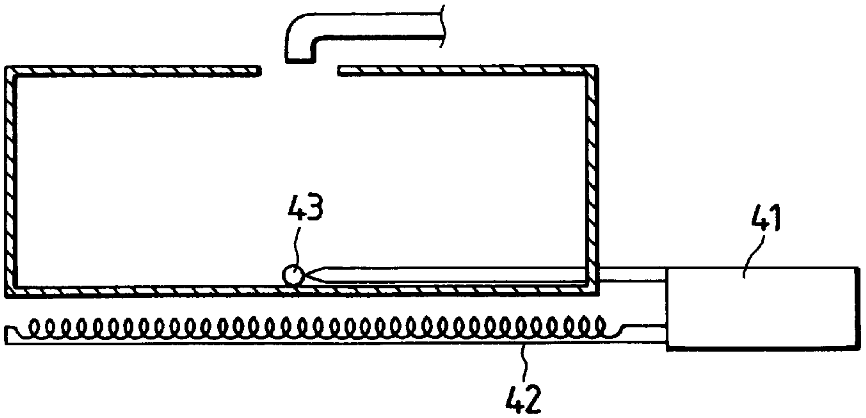
FIG. 4 is a side view showing a third embodiment of the waste ink tank according to the present invention.
Figure 5:
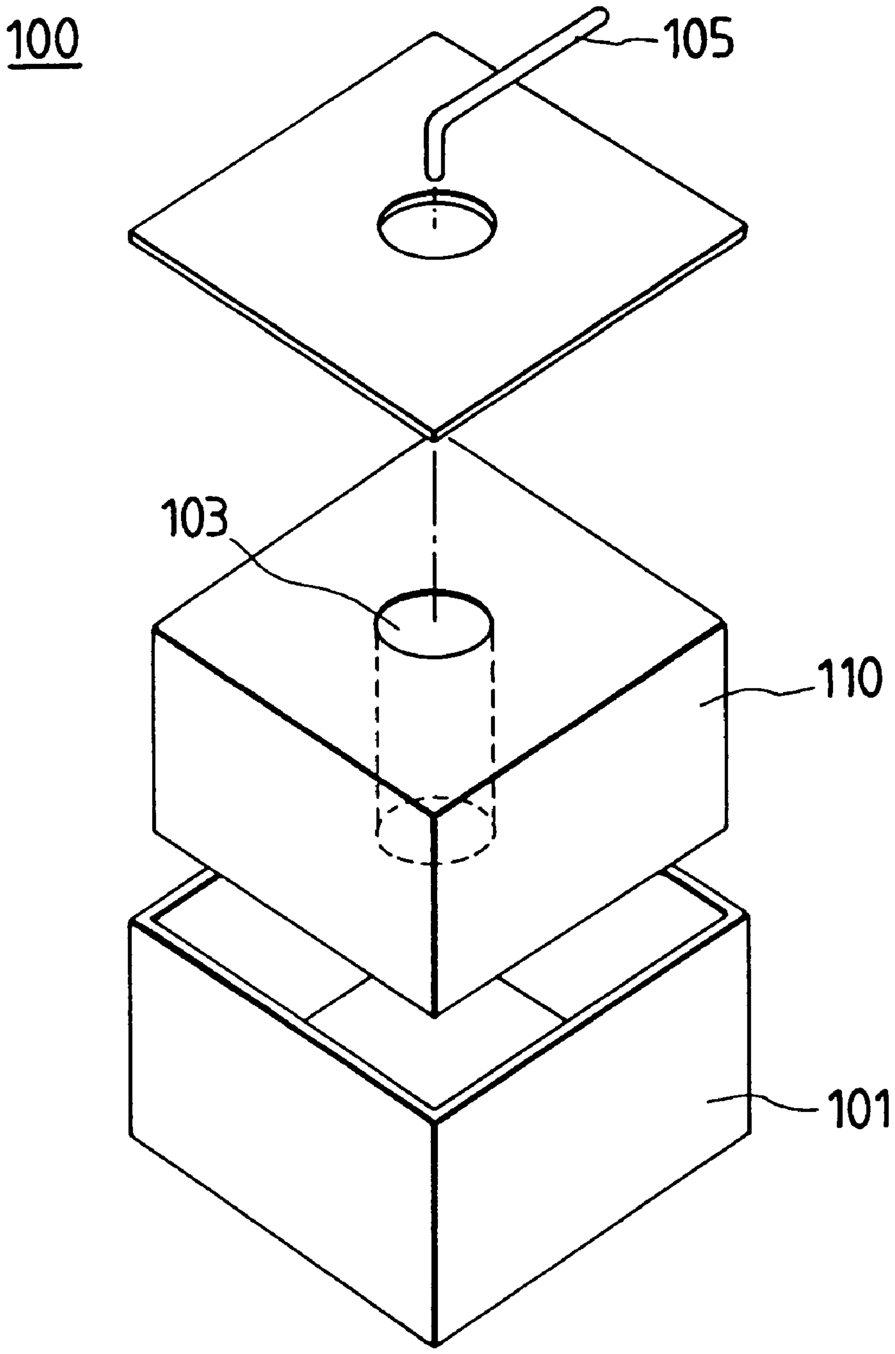
FIG. 5 RELATED ART
FIG. 5 is an exploded perspective view showing a conventional waste ink tank.

FIG. 4 shows a third embodiment. In this embodiment, when waste ink has been wasted, a drive circuit 41 is turned-on so as to perform heating by means of a heater 42. It is preferable that the heating temperature is made to be not lower than the lowermost film-forming temperature of resin emulsion contained in ink. Since the lowermost film-forming temperature of styrene acrylester emulsion which is thermoplastic resin contained in the ink composition to be used in this embodiment is 85° C., heating is performed at a temperature not lower than 85° C. so that the water content vanishes and the surfaces of thermoplastic resin particles are fused so as to be bonded to each other. Therefore, even when not-yet-dried ink flows-in again thereafter, re-dispersion does not occur and no ink leaks out from the waste ink tank. Further, it is useful, for ON-OFF control of heating, to set the heating temperature to be higher than the boiling point of the ink. The drive circuit 41 is turned-on to perform heating by means of the heater 42. The temperature is kept, also by heating, at about 100° C. which is the boiling point, while water which is a main volatile component of waste ink remains. When the water content is evaporated to vanish, however, the temperature rises over the boiling point to be not lower than 100° C. By rising of the temperature, the fact that the water content has vanished can be detected. Thereafter, a temperature detector 43 detects the fact that the temperature reaches a temperature, for example, 110° C., which is higher than the boiling point, and then the drive circuit 41 is turned off. As a result, unnecessary consumption of electric power and overheating can be prevented. Further, since the water content is once perfectly evaporated, a larger quantity of ink can be stored. The waste ink tank is required to have thermal resistance so that no obstacle due to heating is generated. Moreover, it is more preferable to use metal such as aluminum or the like which has good heat transmission.

As apparent from the foregoing description, according to the present invention, waste ink can be efficiently accumulated and the re-dispersing property, and hence the fluidity, of the waste ink stored in the waste ink tank is eliminated to thereby make it possible to prevent the waste ink from flowing-out during transportation or the like.

What is claimed is:

1. In a waste ink tank of an ink jet recording apparatus for storing waste ink of an ink-jet ink composition containing a pigment, thermoplastic resin, and a dispersing agent in an aqueous medium, said waste ink tank comprising an ink absorber disposed therein, said ink absorber being impregnated with an ink coagulating agent including metal salt, wherein the ink coagulating agent coagulates and retains said waste ink in said waste ink tank.

2. The waste ink tank of an ink jet recording apparatus according to claim 1, wherein said metal salt dissociates at least one kind of metal cation selected from a group consisting of $Mg^{++}$, $Ca^{++}$, $Cu^{++}$, $Ni^{++}$, $Zn^{++}$, $Ba^{++}$, $Fe^{++}$, $Al^{+++}$, $Fe^{+++}$, $Cr^{+++}$ when said metal salt is dissolved.

3. The waste ink tank of an ink jet recording apparatus according to claim 1, wherein said ink coagulating agent comprises a water-soluble solvent in which said metal salt is dissolved.

4. The waste ink tank of an ink jet recording apparatus according to claim 3, wherein said ink absorber comprises a porous matter.

5. The waste ink tank of an ink jet recording apparatus according to claim 4, wherein said ink absorber is vertically disposed in said waste ink tank.

6. The waste ink tank of an ink jet recording apparatus according to claim 3, wherein said water-soluble solvent contains at least one kind of solvent selected from diethylene glycol, triethylene glycol, and glycerol.

7. The waste ink tank of an ink jet recording apparatus according to claim 6, wherein said water-soluble solvent contains water.

8. The waste ink tank of an ink jet recording apparatus according to claim 1, wherein said waste ink tank has an air flow inlet and an air flow outlet so that an inside thereof is ventilated.

9. The waste ink tank of claim 8, wherein said air flow inlet and said air flow outlet are positioned diagonally in a plane.

10. An ink jet recording apparatus for performing recording by jetting ink onto a recording medium, comprising:

a waste ink tank for storing waste ink of an ink-jet ink composition containing a pigment, thermoplastic resin, and a dispersing agent in an aqueous medium; and heating means for heating said waste ink tank which heats said waste ink at a temperature not lower than a lowermost film forming temperature of said thermoplastic resin contained in said waste ink.

11. The ink-jet recording apparatus according to claim 10, wherein a temperature for heating said waste ink tank is selected to be not lower than a boiling point of said waste ink.

12. The ink jet recording apparatus of claim 11, further including a temperature detector which detects when the temperature of said waste ink exceeds the boiling point of said waste ink which causes said heating means to be turned off.

13. An ink jet recording apparatus comprising:

a waste ink tank; and an ink coagulating agent for coagulating waste ink of an ink-jet ink composition accommodated in said waste ink tank, said ink composition containing a pigment, thermoplastic resin, and a dispersing agent in an aqueous medium, said ink coagulating agent comprising metal salt, wherein the ink coagulating agent is accommodated in said waste ink tank to thereby coagulate and retain waste ink of the ink composition.

14. The ink coagulating agent according to claim 13, wherein said metal salt dissociates at least one kind of metal cation selected from a group consisting of $Mg^{++}$, $Ca^{++}$, $Cu^{++}$, $Ni^{++}$, $Zn^{++}$, $Ba^{++}$, $Fe^{++}$, $Al^{+++}$, $Fe^{+++}$, $Cr^{+++}$ when said metal salt is dissolved.

15. The waste ink tank of an ink jet recording apparatus according to claim 13, wherein said ink coagulating agent comprises a water-soluble solvent in which said metal salt is dissolved.

16. The ink coagulating agent according to claim 15, wherein said water-soluble solvent contains at least one kind of solvent selected from diethylene glycol, triethylene glycol, and glycerol.

17. The ink coagulating agent according to claim 16, wherein said water-soluble solvent contains water.

* * * * *